UNITED STATES PATENT OFFICE.

HIPPOLYTE MÉGE, OF PARIS, FRANCE, ASSIGNOR, BY MESNE ASSIGNMENTS, TO THE UNITED STATES DAIRY COMPANY, OF NEW YORK CITY.

IMPROVEMENT IN TREATING ANIMAL-FATS.

Specification forming part of Letters Patent No. 146,012, dated December 30, 1873; Reissue No. 5,868, dated May 12, 1874; application filed May 5, 1874.

*To all whom it may concern:*

Be it known that I, HIPPOLYTE MÉGE, of Paris, France, have discovered that a substance substantially identical with true butter may be extracted from the fats of kine or other animals; and I have invented processes by which this product may be produced with greater or less perfection, as it may be desired.

The butter which is obtained from milk is produced by the cow by elaborating her own fat through her cellular and mammary tissues at the low temperature of the body. The animal-fat from which the butter-cells in milk are produced is composed chiefly of oleine, margarine, stearine, and small quantities of other substances. The natural process performed by the cow consists mainly, first, in separating the oleomargarine from the stearine without developing disagreeable odors or flavors in the oleomargarine; and, secondly, in producing a slight change in the oleomargarine, by which it assumes the character of butter.

The object of my invention is to produce the same effects by artificial means, and I accomplish it by the methods hereinafter described.

When fat is melted at a high temperature, such as is employed in rendering tallow, it has a disagreeable odor, very difficult to remove. It is therefore necessary to avoid any process which employs high heat. A temperature of about 103° Fahrenheit, or slightly upward, is practically about sufficient for melting the fat in the treatment hereinafter described. It is also true that oleomargarine melts at a lower temperature than stearine. It is therefore desirable to use a temperature below the melting-point of stearine when the process of separation is being performed by pressure, so as to leave the stearine in a solid form. I find the temperature of about 80° Fahrenheit to be very proper for this purpose.

The use of low temperature, for the reasons referred to, is controlling in the process I have invented for separating the oleomargarine from the stearine, and thereby producing a virgin fat free from the taste or odor of natural fat and free from that which is produced by melting it at a high temperature, and out of which butter may be easily made.

The first step preparatory to the process of separation is to crush, grind, or disintegrate the fat by any suitable machinery—such as rollers or millstones—and to wash it by a stream of pure water, which may be poured on it while the act of disintegrating is being performed, until it is as free as possible of everything soluble or separable by water. The fat, being thus thoroughly cleaned and disintegrated, may be subjected to artificial digestion.

The gastric juice is made with the half of the stomach of a pig, sheep, or calf and three liters of water containing thirty grams of bisulphate of lime. After a maceration of three hours, the infusion is passed through a fine sieve and two liters of gastric juice, which are sufficient for a hundred kilograms of fat, with which it is to be mixed. The temperature of this mixture is to be slowly raised to about 103° Fahrenheit, so that the separation shall be complete. The temperature may run higher, and an increase of heat will produce the result rapidly; but care must be taken not to heat the material so as to induce the change which produces disagreeable odors, and my observation is that 125° Fahrenheit is about as high as the heat can be raised safely. The lower temperature produces the most satisfactory results; or the fat may be melted in water of about the same temperature as above described, without the admixture of any other substance, until it is all limpid on the surface and the membraneous matter in it has been deposited on the bottom of the vessel. The water is then drawn off or the fat is removed from its surface, as most convenient, and allowed to cool. This preliminary treatment is for the purpose of removing membrane and obtaining the fat free from foreign substances, as nearly as possible, whereby the separation will more surely result in pure oleomargarine than if these precautions are not taken. In this condition the process of separating the oleomargarine from the stearine is to be performed. This is done either by packing the purified fat in sacks of woolen or cotton cloth and subjecting them to pressure in a press, or by the use of a centrifugal machine such as is used for drying sugar. The effect produced is that the oleomargarine practically separates from the stearine and flows out, leaving the stearine in the sacks or in the centrifugal machine, as one or the other means are used.

The fat must not be allowed to be chilled in this process below the point at which the oleomargarine will flow readily, or the process will cease to yield the product. I find 80° Fahrenheit a good temperature. About sixty per cent. of oleomargarine is thus obtained, more or less, according to the fat used.

The oleomargarine thus produced is free from any disagreeable taste or odor, and is suitable for various culinary uses, and also for replacing olive-oil in the manufacture of soaps, and as a superior lubricator, &c. It is composed, like butter, of oleine, margarine, and a little odoriferous oil, and has not undergone any modification, either by excessive heat or by chemical agents; and this is the substance which, passing through the udders of the cow, where it is subjected to the action of the mammary pepsin, is converted into butter. If this neutral fat is to be immediately used for any of the purposes above indicated to which it is applicable, nothing more need be done with it; but it may be somewhat modified in quality by treating it in a closed vessel, which is provided with a revolving fan or other beater operated from without by a shaft passing through an air-tight opening. The vessel may be immersed in water at suitable temperatures, the fat being agitated by the beater till it becomes quite thick and uniform. When kept cold, it will be solidified and quite brittle. In either case it is desirable, in order to give consistency and tenacity to the oleomargarine, to work it between rollers or otherwise, as is customary with butter.

It is useful to prepare the raw fat for the processes above described by immersing it in a solution of fifteen per cent. of common salt and one per cent. of sulphite of soda, the effect of which will be to prevent fermentation while the process is going on; and after the melting of the fat and its purification as above described, and before it is subjected to the operation of the press or centrifugal machine, I have found it useful to permit the fat to stand for some hours in vessels, into which it has been poured when liquid, and slowly to cool, whereby a partial separation of the stearine occurs in the manner of crystallization in the mass, and the work of the press or centrifugal machine is facilitated.

When it is desired to convert the oleomargarine, as it is separated from the stearine, into butter, if the butter is to be immediately used, that transformation is effected by adding to it a small quantity of curds of milk, (or their equivalent,) or pure milk or cream, and then working it as cream is worked until the butter forms in the usual way. Common salt, one per cent. of bicarbonate of soda, and coloring matter may be added with advantage.

If the butter is to be preserved, it will be better to mix the oleomargarine at animal heat with its weight of water in which has been mixed a fiftieth part of mammary tissue, (which is the udder of the cow minced fine,) a hundredth part of bicarbonate of soda, a fiftieth part of curds of milk, and some coloring-matter, and to agitate the mixture for three hours, maintaining animal heat. When this compound settles and cools, the butter will be good and capable of being preserved. The pepsin in the mammary tissues contains the principle which operates usefully in making the transformation, and it may be obtained by macerating the mammary tissue in water and using the water at about 86° Fahrenheit in making the mixture.

If the butter is needed for long preservation, I add only the mammary pepsin to the oleomargarine, which is prepared as above described, omitting the other ingredients.

It is to be remarked that all the metal vessels used should be thoroughly tinned, and the plates employed to separate the sacks in the press should be doubly coated with tin, in order to prevent any contact with iron or copper.

What I claim as my invention, and desire to secure by Letters Patent, is—

1. The process by which oleomargarine pure and free from disagreeable odor or taste is extracted from animal fats or suets by pressure at a low temperature, substantially as described.

2. The process by which butter can be obtained from oleomargarine by the aid of pepsin and curds of milk, or their equivalents, substantially as described.

3. The new butter-like product or manufacture, substantially as described.

4. The combination of artificial gastric juice, substantially such as described, with animal-fats for the purpose of facilitating the process of separating the oleomargarine from the stearine, as described.

5. In the process of converting oleomargarine into butter, the combination of milk or cream, or the curds of milk, with the oleomargarine, substantially as described.

6. In the same process, the combination of the mammary tissue of the cow or mammary pepsin with the oleomargarine, substantially as described.

In testimony whereof I have signed my name to this specification in the presence of two subscribing witnesses.

HIPPOLYTE MÉGE.

Witnesses:
ROBT. M. HOOPER,
Y. ANGIER.